United States Patent [19]

Demorieux

[11] 4,238,138

[45] Dec. 9, 1980

[54] CONNECTION SYSTEM BETWEEN A SLIDE AND A VERY LONG MEMBER

[75] Inventor: Jean-Marie Demorieux, Montgeron, France

[73] Assignee: Setec Travaux Publics, Paris, France

[21] Appl. No.: 88,302

[22] Filed: Oct. 25, 1979

Related U.S. Application Data

[63] Continuation of Ser. No. 920,419, Jun. 29, 1978, abandoned.

[30] Foreign Application Priority Data

Jul. 20, 1977 [FR] France ............................ 77 22233

[51] Int. Cl.[3] ............................ F16C 29/02

[52] U.S. Cl. ............................ 308/3 R; 238/173; 238/338

[58] Field of Search ............................ 308/3 R, 3 C, 3 B; 238/173, 171, 338, 228, 310

[56] References Cited

U.S. PATENT DOCUMENTS

| | | | |
|---|---|---|---|
| 3,243,236 | 3/1966 | Graham | 308/3 R |
| 3,397,856 | 8/1968 | Sullivan et al. | 308/3 R |
| 3,585,937 | 6/1971 | Bertin | 104/23 FS |
| 3,924,907 | 12/1975 | Czernik et al. | 308/3 R |
| 4,062,490 | 12/1977 | Hixson | 238/310 |

FOREIGN PATENT DOCUMENTS

| | | | |
|---|---|---|---|
| 1174662 | 3/1959 | France | 308/3 R |
| 1389983 | 1/1965 | France . | |

*Primary Examiner*—Lenard A. Footland
*Attorney, Agent, or Firm*—Sughrue, Rothwell, Mion, Zinn and Macpeak

[57] ABSTRACT

A connection system between a slide and a very long member, allowing some longitudinal movement of said member in relation to the slide, corresponding to differential deformation, said slide being of the type which comprises a support provided with clamping parts which surround at least a part of said member. In accordance with the invention, the slide comprises, at the clamping zones, plates made of a material with a low coefficient of friction firstly on the surface of the support facing said member and secondly on the internal surface of each of said clamping parts. Application to connection systems for very long rails such as rails which carry travelling cranes and lateral guide rails for public transport vehicles.

4 Claims, 3 Drawing Figures

CONNECTION SYSTEM BETWEEN A SLIDE AND A VERY LONG MEMBER

This is a continuation, of application Ser. No. 920,419, filed June 29, 1978, now abandoned.

FIELD OF THE INVENTION

The invention relates to a connection system between a slide and a very long member which allows some longitudinal movement of said member in relation to the slide, corresponding to differential deformation, said slide being of the type which comprises a support provided with clamping parts which surround at least a portion of said member.

BACKGROUND OF THE INVENTION

The invention applies in particular to the case where said very long members are constituted by metal sections.

When very long metal sections are used, the relative movement between the slide and the section can be of concern in particular for applications relating to the fixing of very long rails such as: rails which carry travelling cranes; and lateral guide rails for public transport vehicles. These movements can indeed result from the differential expansion of the members under the effect of temperature or even from a deformation by shrinkage and creep of the base which supports the fixed slide in the case of a concrete base.

It is well known that the effects of temperature and/or of shrinkage of concrete on metal parts fixed on solid masses of masonry or on reinforced concrete structures result in great differential deformation in the case of very long continuous members; if these deformations are blocked, appreciable forces are applied to said members and to their fixed supports.

Previous techniques are generally based on the principle of a connection between a slide and a section by bolting, with an oblong hole (generally in the section) to keep the possibility of relative movement between the slide and the section. Such techniques restrict the dimensions of the sections which can be used. Indeed, if the results are acceptable for medium-length sections (e.g. about fifty meters), there are numerous disadvantages when very long sections (one hundred meters and more) are used. The main disadvantages are as follows:

it becomes very tricky to produce sections, since shorter members are used and are butt welded and hence the parallelism of the oblong holes is difficult to obtain, which makes the relative movement of the section in relation to the slide difficult, or even impossible when the clearance between the bolts and the holes associated therewith becomes insufficient;

when it is envisaged to use curved sections with a conventional slide support, there is a very great danger of self-locking; and the installing and adjusting operations remain tricky and require skilled labor, especially when the tolerances are small.

The present invention aims to provide a connection system between a slide and a very long member without the above disadvantages, avoiding in particular the machining of oblong holes, facilitating the installing and adjusting operations and being particularly well adapted to the use of such very long members, while remaining simple and economical to manufacture.

SUMMARY OF THE INVENTION

More particularly, the present invention provides a connection system between a slide and a very long member, the system allowing some longitudinal movement of said member relative to the slide, correponding to differential deformation, said slide being of the type which comprises a support provided with clamping parts which surround at least a part of said member, characterized by the fact that the slide comprises, at the clamping zones, plates made of a material with a low coefficient of friction firstly on the surface of the support facing said member and secondly on the internal surface of each of said clamping parts.

The connection system in accordance with the invention can further have at least one of the folowing characteristics:

the member comprises, on either side of its surrounded portions, polished metal strips positioned so as to be in contact with said plates, so that for all relative longitudinal movement between the slide and the member, the contact surfaces are limited to the surfaces which face said strips and said plates;

the plates made of a material with a low coefficient of friction associated with the support of the slide are glued directly onto the corresponding surface of said support;

the plates which are associated with the support of the slide are made of a material which has a higher modulus of elasticity than that which constitutes the plates associated with the clamping parts of said slide;

the plates made of a material with a low coefficient of friction associated with the clamping parts of the slide consist, for each of said parts, of a thin sheet glued onto an intermediate block made of an elastomer such as neoprene, said block being glued directly on the internal surface of the part concerned and the thin layer being preferably made of polytetrafluoroethylene;

the very long member is a section;

the section is an H section and the two surrounded portions are formed by zones of one of the lateral flanges of said section; and the clamping parts are straps bolted onto the support of the slide so as to surround the portions of said part with a clamping pressure of about 75 bars.

Other characteristics and advantages of the present invention will become more clearly apparent from the following description, given by way of illustration but having no limiting character, with reference to the figures of the accompanying drawings.

BRIEF DESCRIPTION OF THE DRAWINGS

In FIGS. 1 and 2, the very long member 1 is a section which forms a lateral support rail for a public transport vehicle; it is a metal H bar and is generally made of steel; the tire 3 of a guide wheel bears on a lateral flange 2 of this rail. The H bar is held in place by a slide which comprises a support 4 provided with clamping parts such as straps 5 and 6 which surround two half-flanges respectively 7 and 8 of said H bar (here, the two half-flanges form a single lateral flange of the H bar). The support 4 is, for example, bolted on a metal arm 9 fixed in a concrete slab 10.

The connection system between the slide and the H bar must allow some longitudinal play of the latter in relation to the slide corresponding to differential deformation.

In accordance with the invention, the slide includes at the clamping zones plates made of a material with a low coefficient of friction. The disposition of the means used will be better understood from the partial cross-section views of an enlarged scale in FIG. 3.

Figure 3:
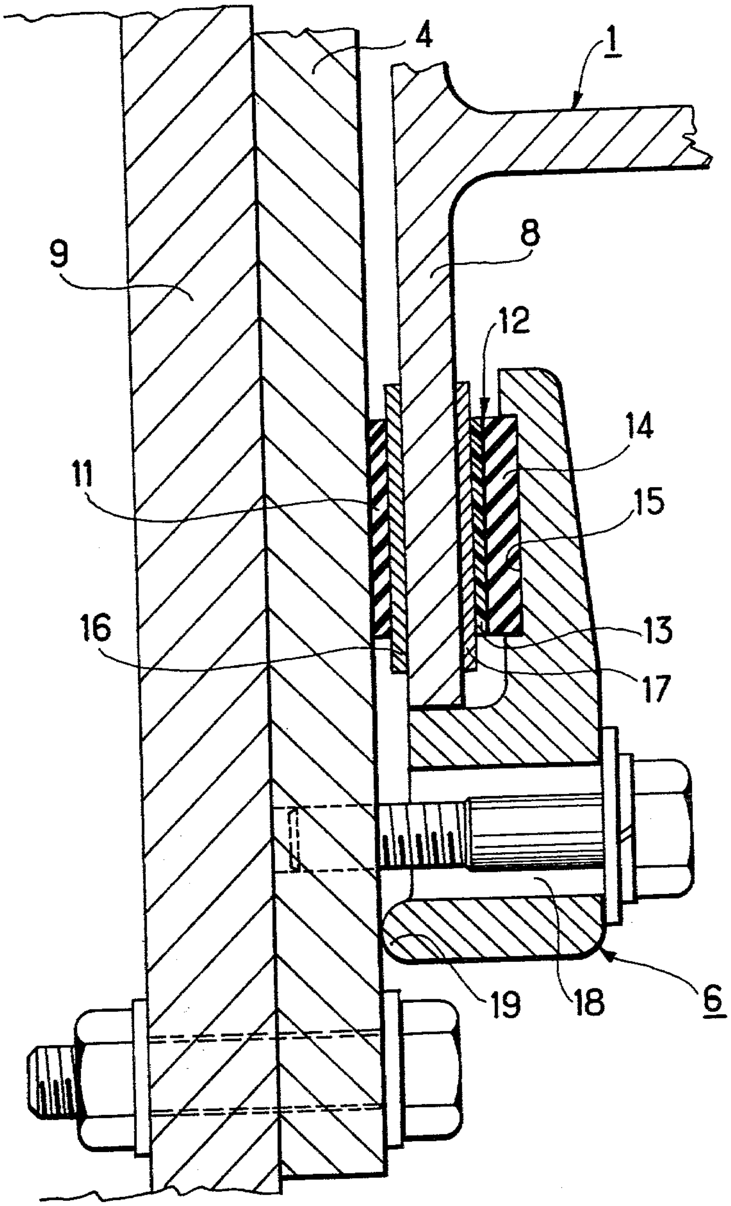
FIG. 3 is a partial cross-section view through III—III of FIG. 2 on a larger scale which brings out clearly the particular sliding means used.

In FIG. 3 the cross-section shows a zone of the half-flange 8 where the H bar 1 is clamped by the strap 6. The slide comprises plates made of a material with a low coefficient of fricton, firstly on the surface of the support 4 which faces the rail (plates 11) and secondly on the internal surface of each of the straps (plate 12 for the strap 6). In accordance with a preferred embodiment, the plates such as 12 associated with the slide consist of a thin sheet 13 which is advantageously made of polytetrafluorethylene, glued on an intermediate block 14 made of an elastomer such as neoprene, said block being glued directly onto the internal surface 15 of the strap; the use of such a block allows in particular the machining tolerances to be compensated. For the particular application considered here, it might be preferable for the plate 11 associated with the support 4, glued directly on the corresponding surface of said support, to be made of a material which has a higher modulus of elasticity than that which constitutes the plates which are associated with the straps, for example about 20,000 $N/cm^2$.

To improve the sliding and to prevent damage to the polytetrafluoroethylene sheet when this variant is chosen, it is advantageous for the H bar to comprise, on each side of its surrounded half-flanges, strips of polished metal, (here referenced 16 and 17), positioned so as to be in contact with the respective plates 11 and 12, so that for any relative movement between the slide and the H bar, the contact surfaces are limited to the surfaces which face said strips and said plates. The strips 16 and 17, which are advantageously made of stainless steel, can be glued directly onto the H bar.

The strap 6 is bolted on the support 4 of the slide so as to surround the half-flange of the H bar with a determined clamping pressure with a view in particular to limiting the force applied to the plates, for example of about 75 bars. An oblong hole 18 and a protruding edge 19 on the other side of the bolt will facilitate installation and required clamping; the clamping intensity can be checked by measuring the compression of the plates, imparting a predetermined compression by means of shims.

Figure 1:
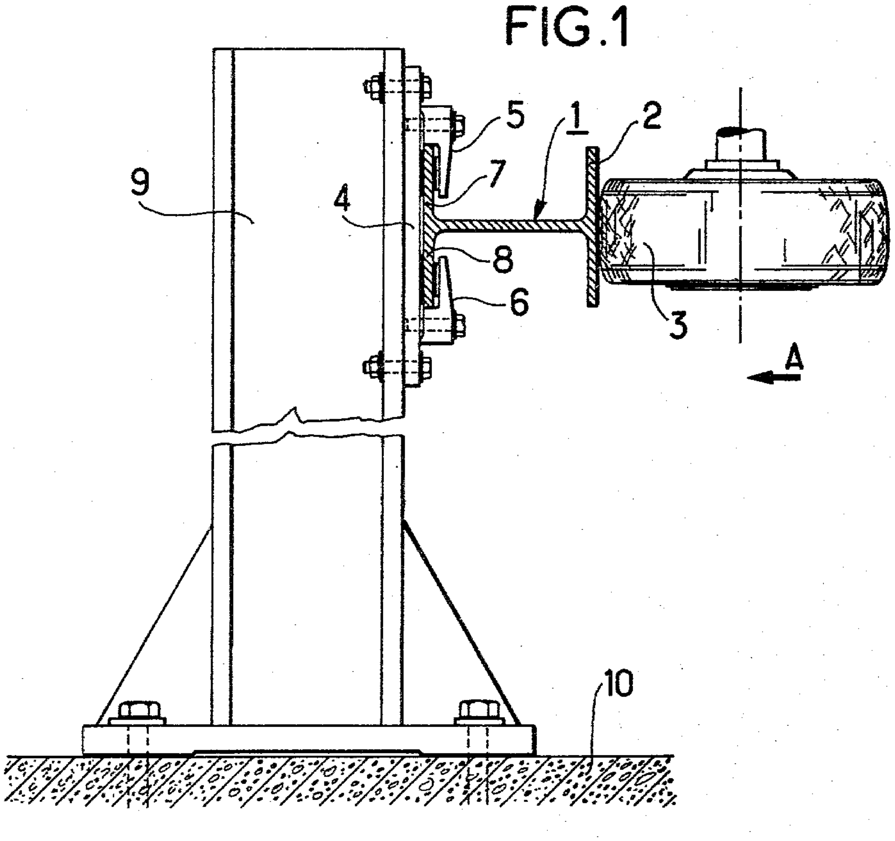
FIG. 1 is a transversal cross-sectional view showing a connection system in accordance with the invention in which the very long member is a section which forms a lateral bearing rail for a public transport vehicle.
Figure 2:
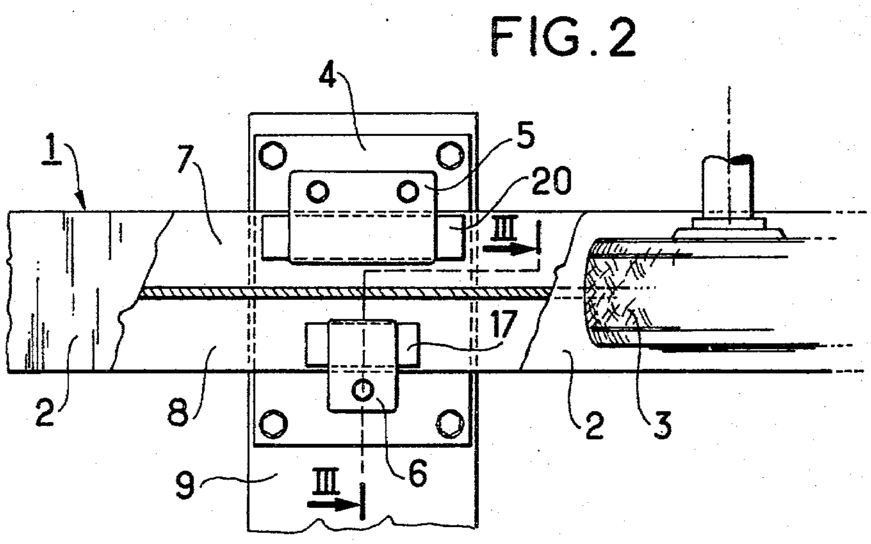
FIG. 2 is a side view, partially broken away in the direction of the arrow A of the system shown in FIG. 1.

As is apparent from FIG. 2, the sizes of the straps 5 and 6 can differ and likewise the stainless steel glued strips, respectively 20 and 17, which are installed to overlap on either side by a sufficient length for the relative movements which correspond to maximum differential deformation.

It should be observed that for the particular application which has been described, the H bar can be a curved lateral guide rail and there is relatively little danger of self-locking.

It is self-evident that the present invention is in no way limited to the examples which have been given by way of illustration and a fortiori as far as concerns applications thereof which can be very different from the case of rails of travelling cranes and lateral guide rails fo public transport vehicles, but it comprises all variants which resume the general definition of the invention such as claimed with equivalent means.

I claim:

1. A connection system for force clamping a very long transport rail to a relatively fixed slide while allowing some longitudinal movement of said rail relative to said slide corresponding to differential deformation, said rail including oppositely directed half flanges, said slide comprising a support provided with clamping parts overlying said half flanges and clamping said half flanges to said support the improvement wherein said support and said clamping parts comprise plates made of a material having a low coefficient of friction respectively mounted to the surface of the support facing said half flanges and secondly on the internal surface of each of said clamping parts facing the opposite side of said half flanges, and wherein said half flanges include polished metal strips mounted on opposite sides for contact with said plates, such that for all relative longitudinal movement of said slide and said rail, the contact surfaces are limited to facing surfaces of said strips and said plates.

2. A connection system according to claim 1, wherein the plates of the support of the slide are made of a material which has a higher modulus of elasticity than that which constitutes the plates of the clamping parts of said slide.

3. A connection system according to claim 1, wherein said very long transport rail is a section.

4. A connecton system according to claim 3, wherein said section is an H section and said flanges constitute lateral flanges of said section.

* * * * *